US009299347B1

(12) United States Patent
Siohan et al.

(10) Patent No.: US 9,299,347 B1
(45) Date of Patent: Mar. 29, 2016

(54) SPEECH RECOGNITION USING ASSOCIATIVE MAPPING (71) Applicant: Google Inc., Mountain View, CA (US)

(72) Inventors: Olivier Siohan, New York, NY (US); Pedro J. Moreno Mengibar, Jersey City, NJ (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/685,790

(22) Filed: Apr. 14, 2015

Related U.S. Application Data (60) Provisional application No. 62/067,005, filed on Oct. 22, 2014.

(51) Int. Cl.
G10L 15/26 (2006.01)
G10L 15/08 (2006.01)

(52) U.S. Cl.
CPC ............... G10L 15/26 (2013.01); G10L 15/08 (2013.01)

(58) Field of Classification Search
CPC ..................... G10L 21/00; G10L 21/0208
See application file for complete search history.

(56) References Cited

U.S. PATENT DOCUMENTS

| 5,680,508 | A | 10/1997 | Liu | |
| 5,745,872 | A * | 4/1998 | Sonmez | G10L 15/20 704/222 |
| 6,038,528 | A * | 3/2000 | Mammone | G10L 15/20 704/203 |
| 6,067,517 | A * | 5/2000 | Bahl | G10L 15/20 704/242 |
| 6,188,982 | B1 * | 2/2001 | Chiang | G10L 15/20 704/233 |
| 6,381,569 | B1 * | 4/2002 | Sih | G10L 15/20 704/233 |
| 6,434,520 | B1 | 8/2002 | Kanevsky | |
| 6,631,348 | B1 * | 10/2003 | Wymore | G10L 15/20 704/233 |
| 6,876,966 | B1 * | 4/2005 | Deng | G06K 9/6256 704/233 |
| 7,062,442 | B2 * | 6/2006 | Berg et al. | 704/270 |
| 7,065,487 | B2 * | 6/2006 | Miyazawa | G10L 15/20 704/233 |
| 7,424,426 | B2 | 9/2008 | Furui | |
| 8,340,308 | B2 | 12/2012 | Chen | |
| 8,615,397 | B2 * | 12/2013 | Hart | G10L 15/065 704/233 |
| 8,849,185 | B2 * | 9/2014 | Cheung et al. | 455/3.06 |
| 9,123,338 | B1 * | 9/2015 | Sanders | G10L 15/265 |
| 2001/0001141 | A1 | 5/2001 | Sih | |
| 2002/0165715 | A1 * | 11/2002 | Riis | G10L 15/08 704/254 |
| 2003/0033143 | A1 | 2/2003 | Aronowitz | |
| 2003/0088411 | A1 | 5/2003 | Ma | |
| 2004/0138882 | A1 * | 7/2004 | Miyazawa | G10L 15/065 704/233 |
| 2004/0162722 | A1 | 8/2004 | Rex | |
| 2004/0260546 | A1 * | 12/2004 | Seo | G10L 15/20 704/233 |

(Continued)

OTHER PUBLICATIONS

Tomar, Vikrant Singh, and Richard C. Rose. "Efficient manifold learning for speech recognition using locality sensitive hashing." Acoustics, Speech and Signal Processing (ICASSP), 2013 IEEE International Conference on. IEEE, 2013.*

Primary Examiner — Matthew Baker
(74) Attorney, Agent, or Firm — Fish & Richardson P.C.

(57) ABSTRACT

Methods, systems, and apparatus are described that receive audio data for an utterance. Association data is accessed that indicates associations between data corresponding to uncorrupted audio segments, and data corresponding to corrupted versions of the uncorrupted audio segments, where the associations are determined before receiving the audio data for the utterance. Using the association data and the received audio data for the utterance, data corresponding to at least one uncorrupted audio segment is selected. A transcription of the utterance is determined based on the selected data corresponding to the at least one uncorrupted audio segment.

20 Claims, 7 Drawing Sheets

(56) References Cited

U.S. PATENT DOCUMENTS

| | | | |
|---|---|---|---|
| 2006/0053008 A1* | 3/2006 | Droppo | G10L 15/20 704/234 |
| 2006/0184362 A1 | 8/2006 | Preuss | |
| 2006/0195317 A1* | 8/2006 | Graciarena | G10L 15/20 704/233 |
| 2007/0118373 A1* | 5/2007 | Wise et al. | 704/235 |
| 2009/0254343 A1* | 10/2009 | Hart | G10L 15/065 704/246 |
| 2010/0318354 A1* | 12/2010 | Seltzer | G10L 15/063 704/233 |
| 2011/0103614 A1* | 5/2011 | Cheung et al. | 381/94.1 |
| 2011/0173208 A1* | 7/2011 | Vogel | G10L 25/48 707/746 |
| 2011/0238416 A1* | 9/2011 | Seltzer | G10L 15/20 704/233 |
| 2011/0307253 A1* | 12/2011 | Lloyd | G10L 15/20 704/233 |
| 2012/0004909 A1* | 1/2012 | Beltman | G10L 15/20 704/233 |
| 2012/0143604 A1 | 6/2012 | Singh | |
| 2013/0223645 A1 | 8/2013 | Hetherington | |
| 2013/0238324 A1* | 9/2013 | Ichikawa | G10L 21/0208 704/226 |
| 2013/0297299 A1* | 11/2013 | Chakrabartty | G10L 15/02 704/211 |
| 2014/0188487 A1* | 7/2014 | Perez Gonzalez | G10L 19/00 704/500 |
| 2015/0127342 A1* | 5/2015 | Sharifi | G10L 17/02 704/239 |

* cited by examiner

SPEECH RECOGNITION USING ASSOCIATIVE MAPPING

CROSS-REFERENCE TO RELATED APPLICATIONS

The present application claims the benefit of U.S. Provisional Application No. 62/067,005, filed Oct. 22, 2014, which is incorporated herein by reference in its entirety for all purposes.

TECHNICAL FIELD

This specification relates to processing speech.

BACKGROUND

An utterance of a user can be detected by a microphone of a computing device. The user's utterance can be processed by the computing device using a speech recognition engine to generate a transcription of the utterance.

SUMMARY

When a computing device detects speech from a user, the audio data that the computing device generates usually typically includes noise. For example, the noise may be ambient noise within the environment of the user. To deal with noise, a speech recognition system may use associative mappings between noisy audio and clean audio to identify less-noisy, or "clean," audio data corresponding to the same sounds that the user spoke. The identified clean audio data can be substituted for the noisy audio data in the speech recognition process to effectively filter out noise from the input audio data.

In general, it is difficult to generate a clean signal from a noisy signal, but it is relatively easy to produce noisy signals from clean signals. Noisy signals can be artificially generated from clean signals, and when this is done, a direct mapping is known between the corrupted signal and the original, clean signal that was used to create the corrupted one. This can be done with many different clean audio signals, and the mappings between corrupted signals and clean signals can be stored, for example, in an index or other data structure. The relationships between clean and noisy signals may form a non-parametric mapping between distorted signals and the corresponding clean signals. When a noisy speech signal is received, the mapping can be used to extract a clean or less-noisy data that approximates the speech characteristics that are present in the noisy speech signal.

For example, a system can build an index or other data collection that maps features of noisy audio to features of clean audio. The index can be created by obtaining clean audio samples, and then artificially corrupting the clean audio by adding, noise, echoes, distortions, or other transformations. Speech features can be extracted from the clean audio as well as from the corrupted audio. The speech features from each clean audio sample are stored in the index, keyed on the features of the corrupted audio.

With an index generated in this manner, features of noisy speech can be used as keys to retrieve corresponding features of clean speech from the index. A system can compare noisy speech data to one or more preprocessed versions of speech data that have been artificially corrupted with different types of noise. By comparing the noisy speech data to the preprocessed versions of speech data that have been artificially corrupted with different types of noise, a clean version of speech data that corresponds to the user's utterance can be identified. The system can perform speech recognition on the uncorrupted, or "clean," version of the particular speech data to generate a transcription of the user's utterance. By performing speech recognition on the clean audio data from the index as opposed to the noisy input speech data, a more accurate transcription of the user's utterance can be obtained.

Innovative aspects of the subject matter described in this specification may be embodied in methods that include the actions of: receiving audio data for an utterance; accessing association data that indicates associations between (i) data corresponding to uncorrupted audio segments, and (ii) data corresponding to corrupted versions of the uncorrupted audio segments, the associations being determined before receiving the audio data for the utterance; using the association data and the received audio data for the utterance to select data corresponding to at least one uncorrupted audio segment; and determining a transcription for the utterance based on the selected data corresponding to the at least one uncorrupted audio segment.

Other embodiments of these aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

These and other embodiments may each optionally include one or more of the following features. In various examples, using the association data and the received audio data for the utterance to select the data corresponding to the at least one uncorrupted audio segment comprises: comparing the received audio data for the utterance to data corresponding to corrupted versions of one or more of the uncorrupted audio segments; determining, based on the comparison, that the received audio data for the utterance matches data corresponding to a corrupted version of a particular uncorrupted audio segment; and selecting data corresponding to the particular uncorrupted audio segment based on determining that the received audio data for the utterance matches the data corresponding to the corrupted version of the particular uncorrupted audio segment.

In other examples, using the association data and the received audio data for the utterance to select the data corresponding to the at least one uncorrupted audio segment comprises: obtaining feature vectors of the received audio data for the utterance; comparing the feature vectors of the received audio data for the utterance to feature vectors of corrupted versions of one or more of the uncorrupted audio segments; selecting, based on the comparison, a feature vector of a corrupted version of a particular uncorrupted audio segment; and based on selecting the feature vector of the corrupted version of the particular uncorrupted audio segment, selecting data corresponding to the particular uncorrupted audio segment.

In still other examples, the association data comprises one or more index values, and wherein each index value is associated with data corresponding to an uncorrupted audio segment.

In some examples, the association data comprises one or more key-value pairs, and each key-value pair includes (i) data corresponding to an uncorrupted audio segment, and (ii) data corresponding to a corrupted version of the uncorrupted audio segment.

In some examples, the data corresponding to the uncorrupted audio segments is one of audio data for the uncorrupted audio segments, audio feature vectors of the uncorrupted audio segments, hash values for the uncorrupted audio segments, predetermined probability scores for phonetic units corresponding to the uncorrupted audio segments, index values identifying the uncorrupted audio segments, or activations at layers of a neural network that are associated with the uncorrupted audio segments, and the data corresponding to the corrupted versions of the uncorrupted audio segments is one of audio data for the corrupted versions of the uncorrupted audio segments, audio feature vectors of the corrupted versions of the uncorrupted audio segments, hash values for the corrupted versions of the uncorrupted audio segments, index values identifying the uncorrupted audio segments, or activations at layers of a neural network that are associated with the corrupted versions of the uncorrupted audio segments.

In various examples, the corrupted versions of the uncorrupted audio segments are each a version of an uncorrupted audio segment that has been modified to add noise, reverberation, echo, or distortion.

In various examples, the corrupted versions of the uncorrupted audio segments are each a version of an uncorrupted audio segment that has been modified to include audio characteristics representative of one or more candidate environments.

In various examples, the features include before receiving the audio data for the utterance: accessing data that includes uncorrupted audio segments; adding noise to the uncorrupted audio segments to generate, for each uncorrupted audio segment, one or more corrupted versions of the uncorrupted audio segment corresponding, wherein each of the one or more corrupted versions of the uncorrupted audio segment has different noise added to the uncorrupted audio segment; generating, for each of the corrupted versions of the uncorrupted audio segments, association data that indicates an association between (i) data corresponding to the uncorrupted audio segment, and (ii) data corresponding to the corrupted version of the uncorrupted audio segment; and storing the association data.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1:
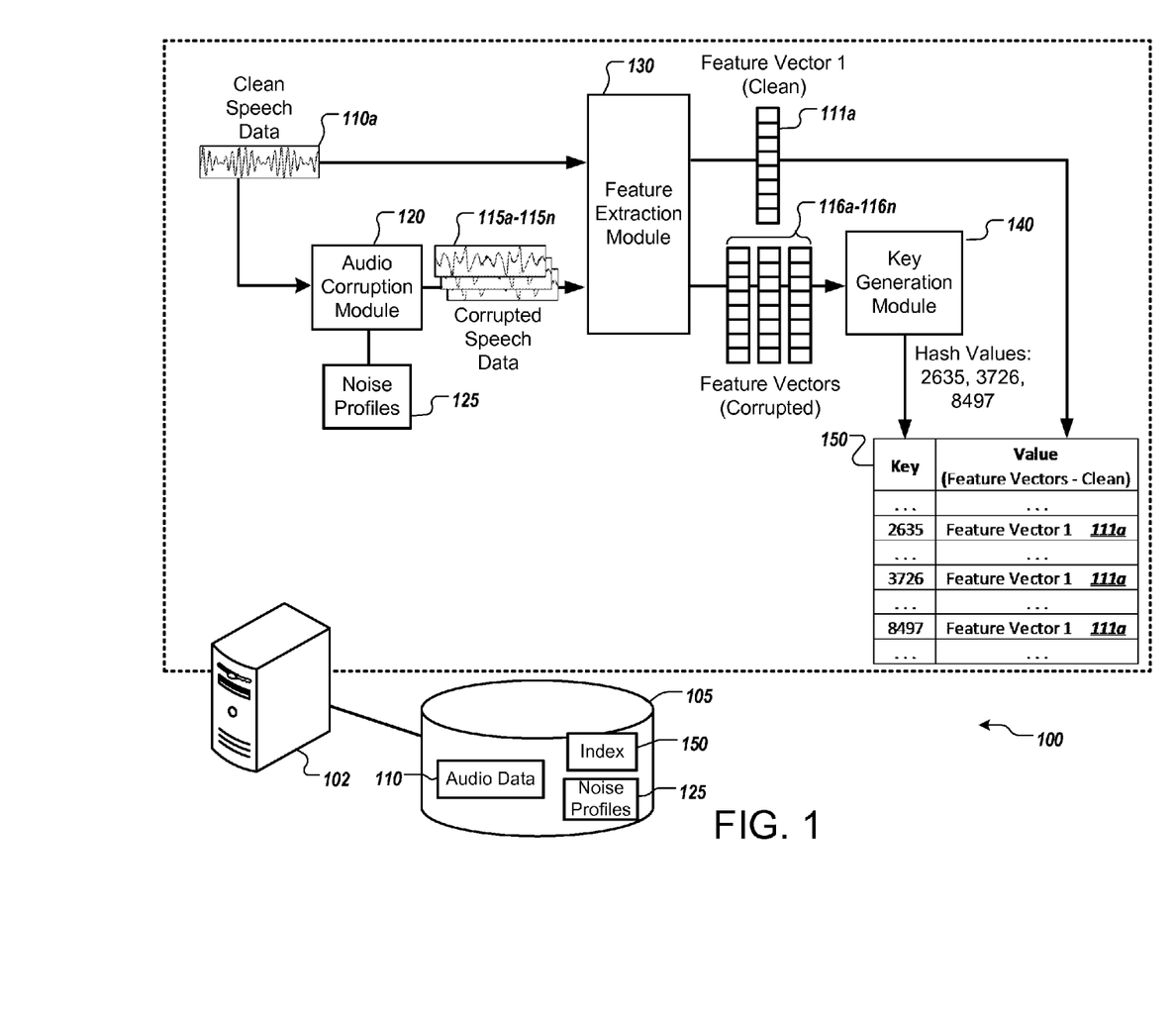
FIG. 1 depicts an example system for generating associative mappings of clean and artificially corrupted versions of speech data.

FIG. 1 depicts a system 100 for generating associative mappings of clean speech data and artificially corrupted versions of speech data. Briefly, the system of FIG. 1 can artificially corrupt speech data by adding one or more types of noise or distortion to uncorrupted, or "clean," speech data. The system stores data that associates the clean speech data with the artificially corrupted speech data generated from the clean speech data. For example, the system 100 can extract speech features of the clean speech data, and also extract audio features from the artificially corrupted versions of the speech data. The system 100 can generate a key or index value for each artificially corrupted speech sample, based on the audio features extracted from the artificially corrupted speech sample. For each corrupted speech sample, the system 100 can store data that maps the generated key to the features of the clean speech sample that the corrupted speech sample was derived from. As a result, the associative mappings can be used to look up the clean speech data corresponding to noisy speech data.

The system 100 of FIG. 1 includes a computing system 102, which may be implemented as one or more computers, which may be distributed across multiple geographic locations. The computing system 102 includes an audio corruption module 120, a feature extraction module 130, a key generation module 140, and an index 150. The computing system 102 has access to one or more samples of clean speech data 110. The computing system 102 also has access to one or more noise profiles 125 that each correspond to a particular type of noise. For example, the computing system 102 may access the samples of clean speech data 110 and the noise profiles 125 from one or more storage devices 105, which may be local to or remote from the computing system 102. For instance, the computing system 102 may be capable of accessing the clean speech data 110 and/or the noise profiles 125 over one or more networks.

To generate the index 150 of clean and artificially corrupted speech data, the computing system 102 can access samples of clean speech data 110. The clean speech data 110 can include samples of many different words and sounds, and may include speech of multiple different people. In some implementations, the clean speech data 110 includes a large set of data that includes examples of all or nearly all sounds that commonly occur in a language. The clean speech data 110 may be processed in individual segments, for example, by processing 25 ms segments of each utterance individually. The clean speech data 110 can include any analog or digital representation of human speech, for example, an analog or digital waveform.

The computing system 102 provides the clean speech data 110 to the feature extraction module 130. As indicated above, the utterances in the clean speech data 110 can be split into segments, for example, 25 ms segments. The feature extraction module 130 extracts a set of features from each clean speech segment to generate a clean feature vector for each clean speech segment. In the example, a particular speech segment 110a is input to the feature extraction module 130, and the speech features determined based on this speech segment 110a form the clean feature vector 111a. The feature extraction module 130 can extract features by performing spectral analysis on the clean speech segment 110a, and using the results of spectral analysis to determine the features in the clean feature vector 111. In some implementations, the features extracted by the feature extraction module may be Mel-Frequency Cepstral Coefficients (MFCC) and/or log-energies from Mel-scale filter banks.

Additionally, the computing system 102 provides the clean speech data 110 to the audio corruption module 120 to generate one or more artificially corrupted versions of the clean speech data 110. For simplicity, the audio corruption module 120 is illustrated as receiving a single clean speech segment 110a. Nevertheless, the audio corruption module 120 may receive a series of clean audio segments or entire utterances for processing rather than individual segments, for example, to apply reverberation and other effects to the clean audio 110.

To artificially corrupt the clean speech data 110, the audio corruption module 120 adds noise and/or distortion as indicated in one or more noise profiles 125. Each noise profile 125 indicates characteristics of a particular type of noise or distortion. For example, each noise profile 125 can include parameters or characteristics that are representative of ambient audio for a particular type of environment. A first noise profile may correspond to noise that is representative of an environment of a car, a second noise profile may correspond to noise that is representative of a retail store environment, and so on. Other such environments may include, for example, an outdoor environment, train station environment, restaurant environment, office environment, concert environment, urban street noise environment, home environment, etc. In some implementations, one or more of the noise profiles 125 may be associated with noise that is not representative of a particular environment, for example, white noise, Gaussian noise, etc. Individual noise profiles 125 may indicate combinations of different types of noise and/or distortion. Multiple noise profiles 125 can be useful because different users may experience different environments, and even a single user may be in different environments at different times. The multiple noise profiles 125 can help add robustness to the system, allowing it to be able to deal with many different types of noise so that the system is accurate even when it is not known what type of noise environment the user is currently in.

In the example, the audio corruption module 120 generates multiple artificially corrupted versions 115a-115n of the clean speech segment 110a by applying the different noise profiles 125 to the clean speech segment 110a. For each of the multiple noise profiles 125, a different corrupted version 115a-115n of the clean speech segment 110a is generated. For example, when there are n different noise profiles 125, the audio corruption module 120 generates n different corrupted audio segments for the clean speech segment 110a. Thus there can be multiple different corrupted versions 115a-115n generated for every clean speech segment 110a, where each corrupted version 115a-115n reflects the addition of different noise and distortion characteristics.

In some implementations, the audio corruption module 120 generates artificially corrupted versions of the clean speech data 110 by digitally adding noise to the clean speech data 110. In some implementations, the audio corruption module 120 uses a room simulator to simulate the effects of different types of rooms or other environments. For example, the audio corruption module 120 can add noise and distortion simulating a car environment by configuring a room simulator to represent the acoustic characteristics representative of a car environment, and applying the room simulator to the clean speech data 110. In this manner, the audio corruption module can corrupt the clean speech data 110 with reverberations and/or multiple sources of noise. In general, computing the artificially corrupted version of the clean speech data 110 can be represented by the equation $Y=f(S, N, H)$, where Y represents the artificially corrupted version of the clean speech data 110, f represents a function, S represents the clean speech data 110, and N and H are corruption or distortion factors.

After generating one or more artificially corrupted versions of the clean speech data 110, the audio corruption module 120 provides the one or more artificially corrupted versions of the clean speech data 110 to the feature extraction module 130. Using the techniques described previously, the feature extraction module 130 processes the one or more artificially corrupted versions of the clean speech data 110 to generate corresponding one or more corrupt feature vectors. In the illustrated example, a corrupt feature vector 116-116n is generated for each of the corrupted versions 115a-115n of the clean speech segment 110a. In so doing, the feature extraction module 130 generates corrupt feature vectors 116a-116n that each correspond to a version of the clean speech segment 110a that has been artificially corrupted to include different noise characteristics, such as noise from different environments. For example, a first corrupt feature vector may correspond to a version of the clean speech segment 110a that has been corrupted to include noise characteristics representative of a car environment, while a second corrupt feature vector may correspond to a version of the clean speech segment 110a that has been corrupted to include noise characteristics representative of a retail store environment.

The audio corruption module 120 provides the corrupt feature vectors 116a-116n to the key generation module 140. The key generation module 140 processes each corrupt feature vector 116a-116n to generate a corresponding hash value for each corrupt feature vector 116a-116n. In FIG. 1, the hash values "2635," "3726," and "8497" correspond to the corrupt feature vectors 116a-116n, respectively. The hash values derived from the corrupt feature vectors 116a-116n are then associated with the clean feature vector 111a. For example, each hash value can be used as a key in a key-value pair, where the value in the pair is the clean feature vector 111a. In some implementations, the key generation module 140 uses locality sensitive hashing (LSH) to generate the hash values from the corrupt feature vectors 116a-116n.

In some implementations, the key generation module 140 may apply a transform to the corrupt feature vectors 116a-116n to reduce the dimensionality of the corrupt feature vectors 116a-116n, and may use the results of the applied transform as the keys corresponding to the corrupt feature vectors 116a-116n. For example, the key generation module 140 may use principal component analysis (PCA) to reduce the dimensionality of the corrupt feature vectors 116a-116n. In other examples, the dimensionality of the corrupt feature vectors 116a-116n may be reduced by using other techniques, such as an auto-encoder neural network with a bottleneck layer, whose activations are used as the keys in the key-value pairs. Other hashing or dimensionality reduction techniques may be applied to the corrupt feature vectors 116a-116n by the key generation module 140. In some implementations, the corrupt feature vectors 116a-116n may be used as keys in key-value pairs instead of hash values or other keys.

The keys produced by the key generation module 140 are used to build the index 150. The hash values corresponding to the corrupt feature vectors 116a-116n are assigned as keys in key-value pairs to be stored in the index 150. For example, the hash value for the corrupt feature vector 116a is "2635," and the index 150 can be updated so that the hash value "2635" is a key or index value associated with the clean feature vector 111a. Similarly, the hash value for the corrupt feature vector 116b is "3726," and the index 150 can be updated so that the hash value "3726" is another key or index value associated with the clean feature vector 111a. Each key-value pair in the index 150 associates information about clean speech (e.g., the feature vector 111a) with a key derived from a corrupted version of the speech.

As shown in FIG. 1, there may be multiple corrupt feature vectors 116a-116n for a single clean feature vector 111a. As a result, the clean feature vector 111a may be associated with multiple different keys in the index 150. For example, since each of the corrupt feature vectors 116a-116n corresponds to a different corrupted version of the clean speech segment 110a, the clean feature vector 111a is assigned as the value in the key-value pair for each of the hash values "2635," "3726," and "8497."

The system of FIG. 1 may repeat the process for many different clean speech segments, to generate an index 150 that contains a large number of key-value pairs that associate characteristics of corrupt audio to characteristics of corresponding clean audio. For example, the system of FIG. 1 may repeat such a process for any number of different phrases, words, commands or hotwords, or parts of speech. For example, the clean audio 110 may be a large corpus of unsupervised recordings that includes common words and phrases, where the recordings have signal-to-noise ratio that is above a minimum threshold. In some implementations, clean audio may be recorded in a studio or other setting for use in generating the index 150.

A number of variations may be implemented. For example, in the index 150, the value in the key-value pairs may be audio data other than a feature vector. For example, the index may indicate a waveform of a clean audio segment instead of a feature vector describing the clean audio segment. To store audio data, the index 150 may include a pointer or reference to the data, rather than storing the data itself. Similarly, the key may be a hash value of a corrupted speech segment 115a-115n, or a corrupted speech segment 115a-115n itself, rather than a hash of a feature vector 116a-116n. The index 150 may be implemented in any appropriate data structure or data storage system, including a database, a tree, a hashtable, or other data structure.

Figure 2:
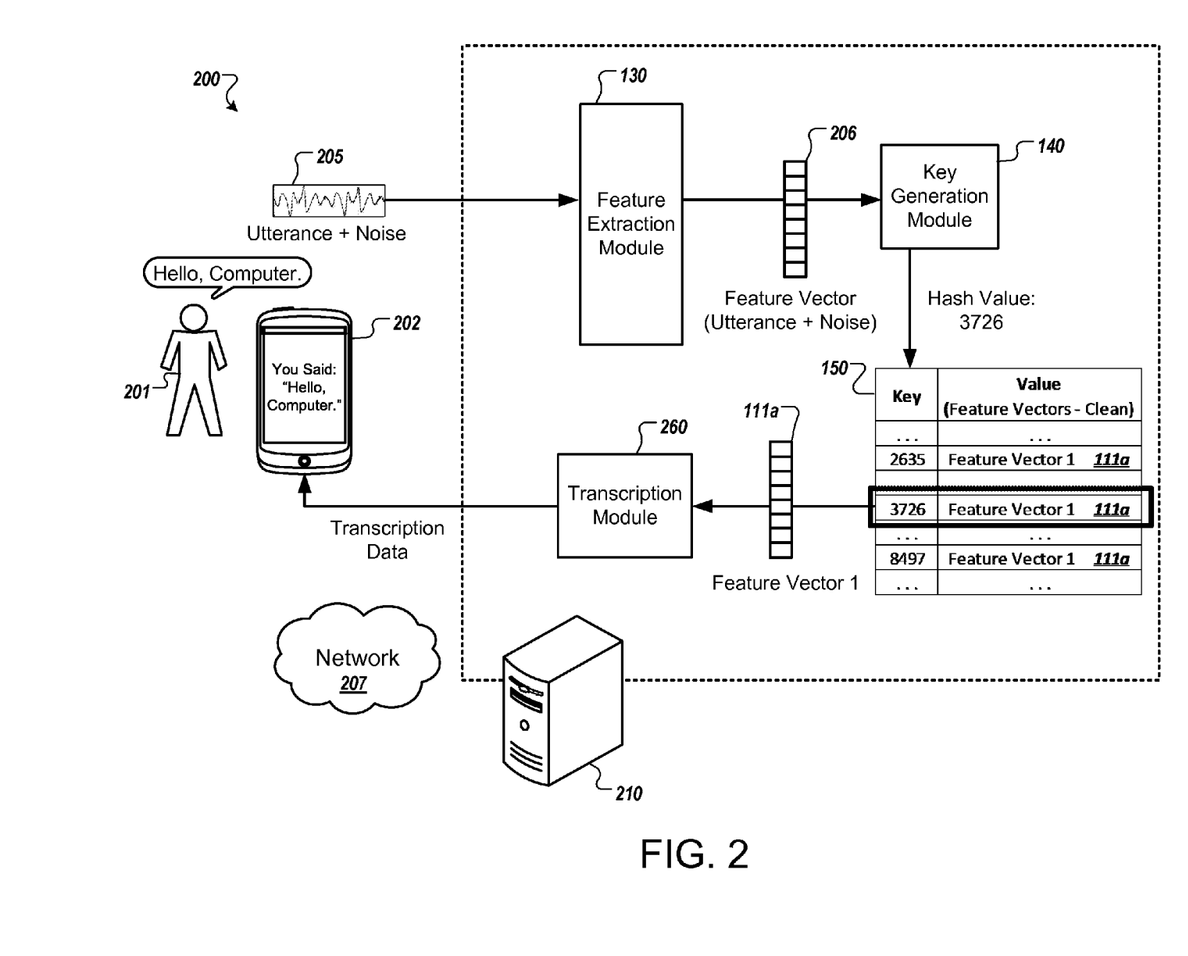
FIG. 2 depicts an example system for performing speech recognition.

FIG. 2 depicts an example system 200 for performing speech recognition using associative mappings between clean and artificially corrupted versions of speech data. Briefly, a user 201 speaks, and the utterance and noise are detected by a computing device 202, such as the user's phone. The computing device 202 sends speech data 205 (which corresponds to the utterance and noise) to a speech recognition system 210 over a network 207, so that the speech recognition system 210 will provide a transcription of the utterance. The speech recognition system 210 uses the received speech data 205 to query the index 150 and obtain feature vectors or other audio data that can be used to generate a transcription. The data obtained from the index 150 can represent characteristics of speech sounds that are the same as or similar to the speech sounds in the received audio 205, but without the noise present in the received audio 205.

In some implementations, the speech recognition system 210 generates a feature vector 206 for each segment of the speech data 205. The feature vector 206 is processed by a key generation module 140 to generate a hash value, vector, or other key used to query the index 150. The key is compared to the keys of the index 150 to select an entry in the index, which may correspond to a matching key or a similar or nearby key. If the key is generated in the same manner as the keys used to create the index, then the clean audio data in the selected entry likely represents the same or similar speech sound as the segment of the utterance. For example, the selected value may be a clean feature vector 111a that corresponds to a clean version of a portion of the speech data 205. This clean feature vector 111a is provided to a transcription module 260 and is used to generate a transcription of the user utterance. The transcription may be provided to the computing device 202, for example, for output to the user 201 or other processing.

In some implementations, the speech recognition system 210 and the computing system 102 are the same system, are systems in communication with one another. Alternatively, the speech recognition system 210 and the computing system 102 may be separate systems, but the speech recognition system 210 has access to the index 150 generated by the computing system 102. The feature extraction engine 130, the key generation module 140, and the index 150 shown in FIG. 2 may be the same as or different from the corresponding elements in FIG. 1.

As shown in FIG. 2, a user 201 may speak an utterance to a computing device 202, such as the phrase "Hello, Computer." The computing device 202 may detect the user's utterance, and may encode the user's utterance as speech data 205. The speech data 205 encoding the user's utterance includes noise that is a byproduct of the user's environment. To obtain a transcription of the user's utterance, the computing device 202 provides the speech data 205 to the speech recognition system 210.

At the speech recognition system 210, the feature extraction module 130 processes the speech data 205 to generate feature vectors corresponding to different portions of the speech data 205. For example, the feature extraction module 130 may generate a feature vector for each segment of the speech data 205. The segments may be, for example, 25 ms segments of the speech data 205 or segments of other lengths. In FIG. 2, the processing for a single segment of the speech data 205 is illustrated, but the same processing may be performed for any and all segments of the speech data 205.

In FIG. 2, the feature extraction module 130 extracts features from one segment of the speech data 205 to generate a feature vector 206. This feature vector 206 represents both a portion of the user's utterance and the noise from the environment of the user 201. The feature extraction module 130 provides the feature vector 206 to the key generation module 140.

The key generation module 140 generates a key based on the feature vector 206. For example, the key generation module 140 may apply a hash function to the feature vector 206 to generate a hash value for the feature vector 206. In the illustrated example, the key generation module 140 generates a hash value of "3726" as the key corresponding to the feature vector 206. In some implementations, as discussed, the key generation module 140 may produce outputs other than a hash value, such as a vector or reduced dimensionality vector. In still other implementations, the key generation module 140 may not perform processing on the feature vector 206, so that the key is the feature vector 206. The data used to query the index 150 is generally in the same format, e.g., a hash value, a vector, etc., of the keys used by the index 150.

The key that is output by the key generation module 140 is used to identify a particular value in the index 150. For example, using the hash value "3726" as a key, the speech recognition system may identify a stored value in the index 150 corresponding to that key of "3726." In some instances, the output of the key generation module 140 may not exactly match any of the keys included in the index 150. In such instances, one or more key-value pairs in the index 150 that are the closest to the output of the key generation module 140 may be identified. Identifying the one or more closest keys to the output of the key generation module 140 may be achieved by using large-scale approximate nearest neighbor techniques, LSH, or similar techniques for identifying the one or more closest keys to the output of the key generation module 140 used to query the index 150. In some instances, even if an exact match for the output of the key generation module 140 is found in the index 150, one or more closest keys to the output of the key generation module 140 may be identified.

As discussed with respect to the example of FIG. 1, each of the values in the key-value pairs stored at the illustrated index 150 is a clean feature vector that corresponds to a particular segment of clean speech data. For example, the key-value pair for the key "3726" may include, as its value, a clean feature vector 111a representing features of a particular phoneme or portion of a phoneme. This clean feature vector 111a may represent the same sound or a similar sound to the portion of the utterance described by the feature vector 206, but with less noise. Accordingly, the clean feature vector 111a may be used as a substitute for the feature vector 206 determined from the input speech data 205. In other words, the clean feature vector 111a retrieved from the index 150 may act as a noise-reduced or higher-quality version of the feature vector 206. Also, note that since the index 150 may be built using the speech samples of many different users, the clean feature vector 111a or other vector retrieved may include or be indicate the characteristics of speech samples provided by one or more users different from the user 201.

Consider, for example, that the feature vector 206 represents an "o" sound from the phrase "Hello, Computer," and that the speech data 205 includes noise from a car environment. Previously, when the index 150 was generated, a low-noise version of an "o" sound was processed. Part of the processing involved artificially adding noise of a simulated car environment, and the corrupted audio was used to determine the key "3726." The features of the low-noise "o" sound were stored as the clean feature vector 111a associated with the key "3726." Later, when the user 201 speaks the "o" sound in a car environment, the speech recognition system 210 generates the hash value "3726" from the feature vector 206 and uses it to query the index 150. This allows the features of the low-noise version of the "o" sound to be obtained, as clean feature vector 111a. This process allows noise reduction through index lookups, without spectral filtering or other noise reduction techniques.

The clean feature vector 111a obtained from the index 150 is provided to a transcription module 260 to be used in generating a transcription. Other clean feature vectors can be selected from the index 150 for other segments of the audio data 205 in the same manner discussed above. The transcription module 260 can perform speech recognition on the feature vector 111a and the other clean feature vectors selected to generate a transcription of the user's utterance, instead of using the feature vector 206 and other feature vectors derived directly from the speech data 205. Since the transcription module 260 is able to perform speech recognition on the clean feature vectors as opposed to the feature vectors that reflect noise from the environment of the user 201, the accuracy of the transcription can be improved. Based on generating the transcription of the feature vector 111a, the transcription of the user's utterance can be provided to the client device 202 and may be presented for output to the user, or may be used in additionally processing by the client device 202, for example, to identify and perform a voice command.

In some implementations, audio waveform data or other data may be retrieved from the index 150 instead of feature vectors. In such implementations, this other audio data may be provided to a speech recognition system to generate a transcription, for example, in place of the speech data 205.

In some implementations, the index 150 stores pre-computed posterior probability scores instead of feature vectors. For example, instead of each key being associated with a clean feature vector 111a for a particular clean audio segment, each key may be associated with a set of probability scores that indicate how likely it is that the particular clean audio segment corresponds to different phonetic units. The phonetic units may be, for example, phonemes or portions of phonemes, and the stored scores may be, for example, scores that an acoustic model produces based on the particular clean audio segment. The set of scores may include a first probability score indicating a likelihood that the audio segment represents a first phonetic unit, a second probability score indicating a likelihood that the audio segment represents a second phonetic unit, and so on, for at least some or all of the potential phonetic units of a language. A sparse encoding may be used so that for each clean audio segment, only a certain number of scores indicating the highest likelihoods, or scores above a threshold level of likelihood, are stored. Omitted scores may be assumed to have a zero probability.

When posterior probability scores are stored in and retrieved from the index 150, the results of querying the index 150 may be averaged together for greater accuracy. For example, when an input audio segment is used to identify a particular key, the sets of probability scores corresponding to multiple nearby keys may be retrieved. From these multiple sets, the posterior probabilities corresponding to the same phonetic unit may be averaged together. The set of averaged scores may then be used as acoustic model scores for the input audio segment to generate a transcription.

Various other techniques may be used with the systems of FIGS. 1 and 2. For example, the index 150 may include contextual information indicating different types of noise or different environments. For example, when a noise profile for a car environment is used, the entries in the index 150 having keys derived from audio corrupted with the car noise profile may be labeled as corresponding to the car environment. As another example, when a noise profile for a restaurant environment is used, the entries in the index 150 having keys derived from audio corrupted using the restaurant noise profile may be labeled as corresponding to the restaurant environment. When speech recognition occurs, a user's phone or other device may provide context information about the environment of the user, for example, through device sensor data, GPS location and movement information, ambient noise readings, user input, or other techniques. The speech recognition system 210 may use context information to select a subset of the entries in the index 150 to use when recognizing speech. For example, if the speech recognition system 210 receives position and movement information indicating that the user is in a car, the speech recognition system 210 may use only the entries in the index 150 corresponding to the car environment, and not use the entries in the index 150 corresponding to the restaurant environment. Accordingly, the speech recognition system 210 may select one or more candidate environments that the user may be likely to be in, and use the associative mappings related with those environments instead of using the full set of associative mappings in the index 150.

Figure 3:
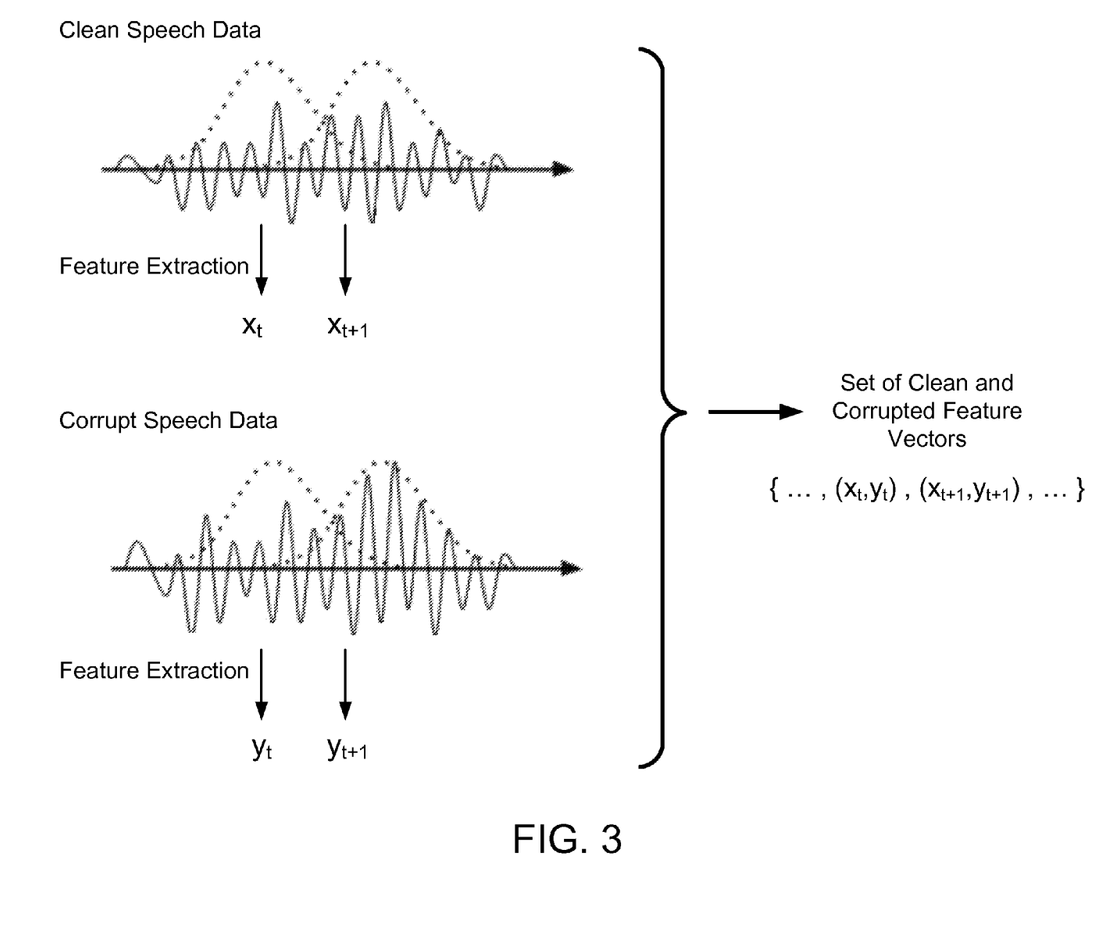
FIG. 3 depicts a process for generating associative mappings of clean and artificially corrupted versions of speech data.

FIG. 3 illustrates a method for generating an index of clean and artificially corrupted versions of speech data. As shown in FIG. 3, audio features can be extracted from both clean speech data and artificially corrupted speech data. As discussed, the features can include features that are usable by a speech recognizer, such as the transcription engine 260 of FIG. 2, to generate a transcription of speech data. Such audio features may include MFCC's or log-energies from Mel-scale filter banks. By extracting feature vectors from both the clean speech data and artificially corrupted speech data, a collection of feature vector pairs is generated, in which one element is the feature vector corresponding to the clean speech data, and the other element is the feature vector corresponding to the artificially corrupted speech data.

Figure 4:
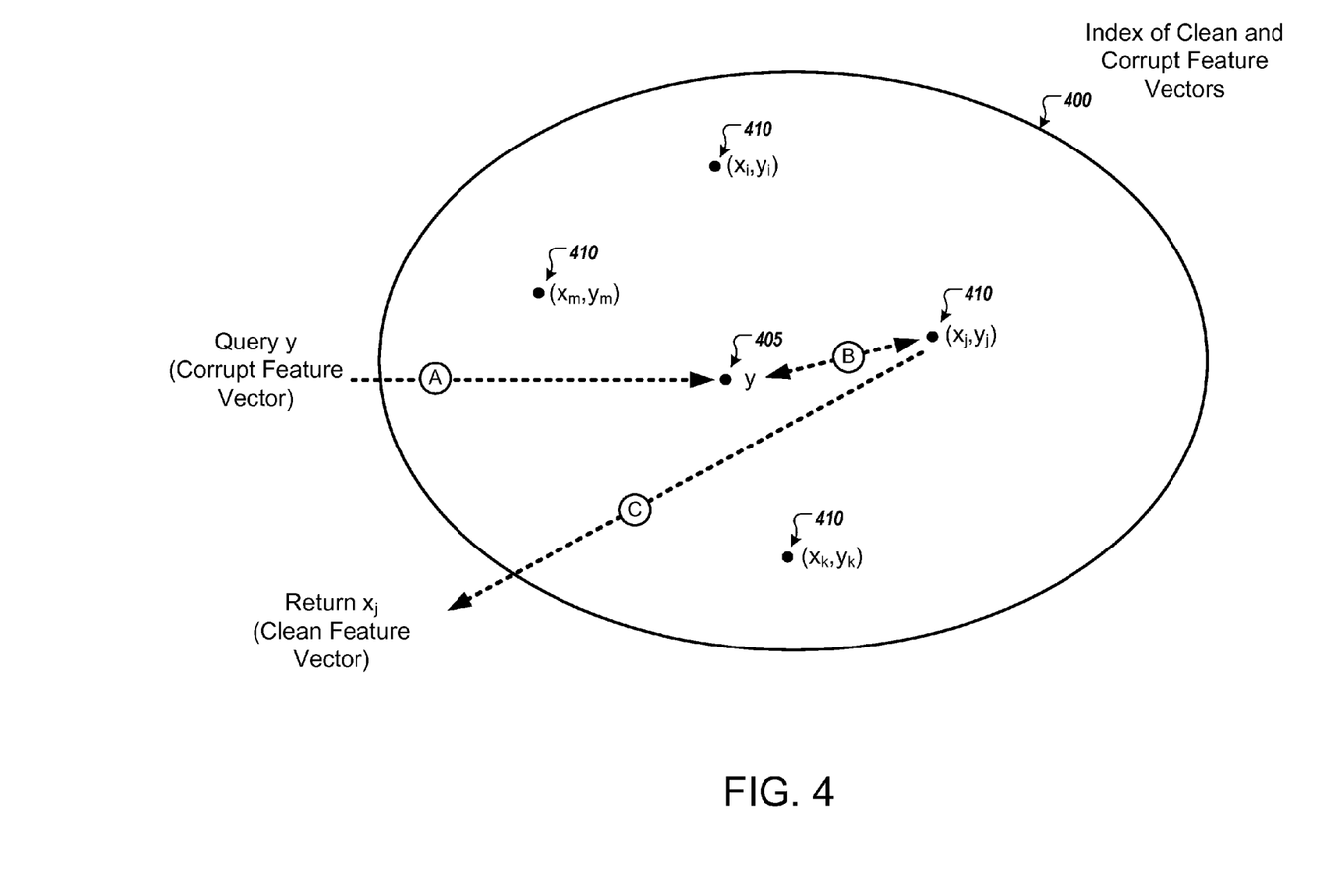
FIG. 4 depicts a method for selecting clean speech data using speech data corresponding to a user utterance.

FIG. 4 illustrates a method for selecting clean speech data using speech data that corresponds to an utterance spoken by a user. As shown in FIG. 4, an index, such as the index 150, is constructed from a collection of feature vector pairs, where each feature vector pair includes a clean feature vector corresponding to clean speech data and a corrupt feature vector corresponding to an artificially corrupted version of clean speech data. The index is keyed on the corrupt feature vector. Given incoming speech data, such as the speech data 205 that includes a user's utterance and noise from the environment of the user 201, a corresponding sequence of feature vectors is computed. Then, each of the feature vectors y is used to query the index, which returns the clean feature vector $x_j$ corresponding to the closest corrupt feature vector $y_j$ from the index. The index shown in FIG. 4 may not necessarily be constructed using feature vectors y, but instead may use a function $y'=g(y)$ to produce the index, where go is a transform that could be used to reduce the dimensionality of the feature vectors y. An example of such transformation, as discussed, is PCA. Other dimensionality reduction approaches can be used for such transformation, such as an auto-encoder neural network with a bottleneck layer, whose activations are used as features.

Figure 5:
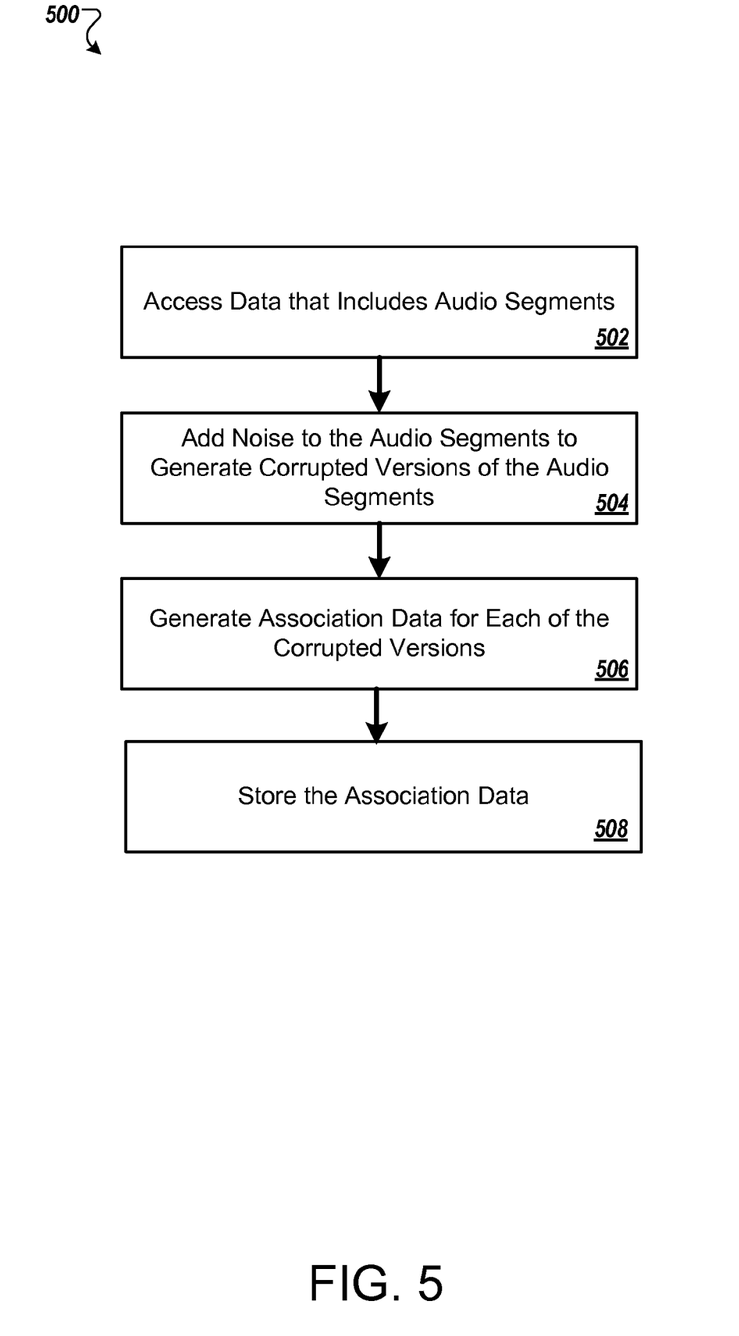
FIG. 5 depicts a flow chart for generating associative mappings of clean and artificially corrupted versions of speech data.

FIG. 5 is a flowchart of an example process for generating associative mappings of clean and artificially corrupted versions of speech data. In some implementations, the process of FIG. 5 may be performed by the computing system 102.

Data that includes uncorrupted, or "clean," audio segments is accessed (502). For example, the computing system 102 of FIG. 1 may store or have access to a database that includes one or more segments of clean speech data, such that the computing system 102 can access the one or more segments of clean speech data.

Noise is added to the uncorrupted audio segments to generate corrupted versions of the uncorrupted audio segments (504). For example, for each segment of clean speech data, the computing system 102 can access one or more noise profiles that each indicate characteristic features of a particular type of noise or distortion. The computing system 102 can add the noise and distortions specified by the noise profiles to the clean speech data segment to generate one or more corrupted versions of the clean speech data segment.

For each of the corrupted versions of the uncorrupted audio segments, association data is generated that associates data corresponding to the uncorrupted audio segment with data corresponding to the corrupted version (506). For example, for each corrupted version of a clean speech data segment, the computing system 102 can generate association data in the form of a key-value pair that associates the corrupted version of the clean speech data segment and the corresponding clean speech data segment. In such an example, as described, the key-value pair may include data corresponding to the corrupted version of the clean speech data segment as the key in the pair, such that the key is a hash value, a feature vector, or a vector of reduced dimensionality. The key-value pair may also include data corresponding to the clean speech data segment, such as a clean feature vector that corresponds to the clean speech data segment.

The association data that indicates, for each of the corrupted versions of the uncorrupted audio segment, the association between data corresponding to the uncorrupted audio segment, and data corresponding to the corrupted version of the uncorrupted audio segment, is finally stored (508). For example, the computing system 102 may store, at the index 150, the key-value pair data that indicates the association between the key, such as the hash value, feature vector, or vector of reduced dimensionality associated with the corrupted version of the clean speech data segment, and the value, such as the feature vector that corresponds to the clean speech data segment.

Figure 6:
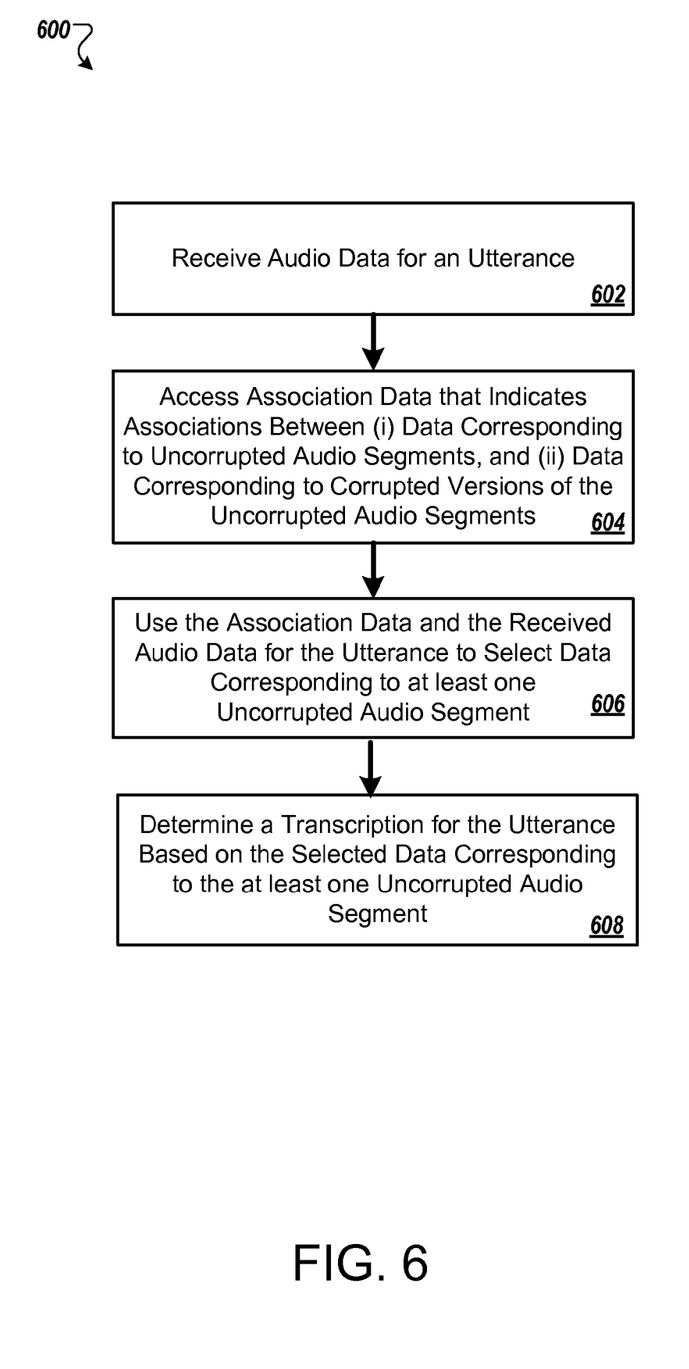
FIG. 6 depicts a flow chart for performing speech recognition using associative mappings of clean and artificially corrupted versions of speech data.

FIG. 6 is a flowchart for a process for performing speech recognition using an index of clean and artificially corrupted versions of speech data. In some implementations, the process of FIG. 6 can be performed by the speech recognition system 210 of FIG. 2.

The process of FIG. 6 begins by receiving audio data for an utterance (602). For example, the user 201 of FIG. 2 can speak an utterance to the computing device 202, and the computing device 202 can provide speech data encoding the user's utterance to the computing system 102. As described previously, such speech data will include the user's utterance as well as noise from the environment of the user 201.

Association data is accessed that indicates associations between data corresponding to uncorrupted audio segments and data corresponding to corrupted versions of the uncorrupted audio segments (604). For example, the computing system 102 can access data at the index 150 that includes key-value pairs. Each key-value pair can associate data corresponding to an artificially corrupted audio segment with data corresponding to the clean speech segment. As described, the key in the key-value pair may include a hash value, a feature vector, a vector of reduced dimensionality, or other data that corresponds to the artificially corrupted version of the clean speech segment data. The value in the key-value pair may include a clean feature vector or other data corresponding to the clean speech segment. The key-value pair data accessed by the computing system 102 can include multiple key-value pairs for each of multiple segments of clean speech data.

Using the association data and the received audio data for the utterance, data corresponding to at least one uncorrupted audio segment is selected (606). For example, the computing system 102 can extract a feature vector from the speech data encoding the user's utterance, and can generate a hash value corresponding to the feature vector. The hash value can be used to query an index, for example, to identify a value in a key-value pair where the key matches the hash value or is near the hash value based on edit distance, vector distance, or other similarity metrics. For example, the hash value for the feature vector from the speech data encoding the user's utterance can be used to query the index 150, and each key in the index is a hash value for a feature vector for an artificially corrupted version of a clean speech segment. A particular key can be identified that matches the hash value corresponding to the feature vector from the speech data encoding the user's utterance, and the value associated with the particular key can be selected. As discussed, the value in such a key-value pair may be a feature vector for the clean speech segment that corresponds to the key.

A transcription of the user's utterance is determined based on the selected data corresponding to the at least one uncorrupted audio segment (608). For example, the computing system 102 can provide the feature vector corresponding to the clean speech segment to a speech recognizer, such as the transcription module 260, to determine a transcription of the feature vector. Performing speech recognition on feature vectors corresponding to clean speech segments retrieved from an index can enhance the accuracy of the transcription, since the feature vectors used to perform the speech recognition do not include the noise from the environment of the user 201.

Figure 7:
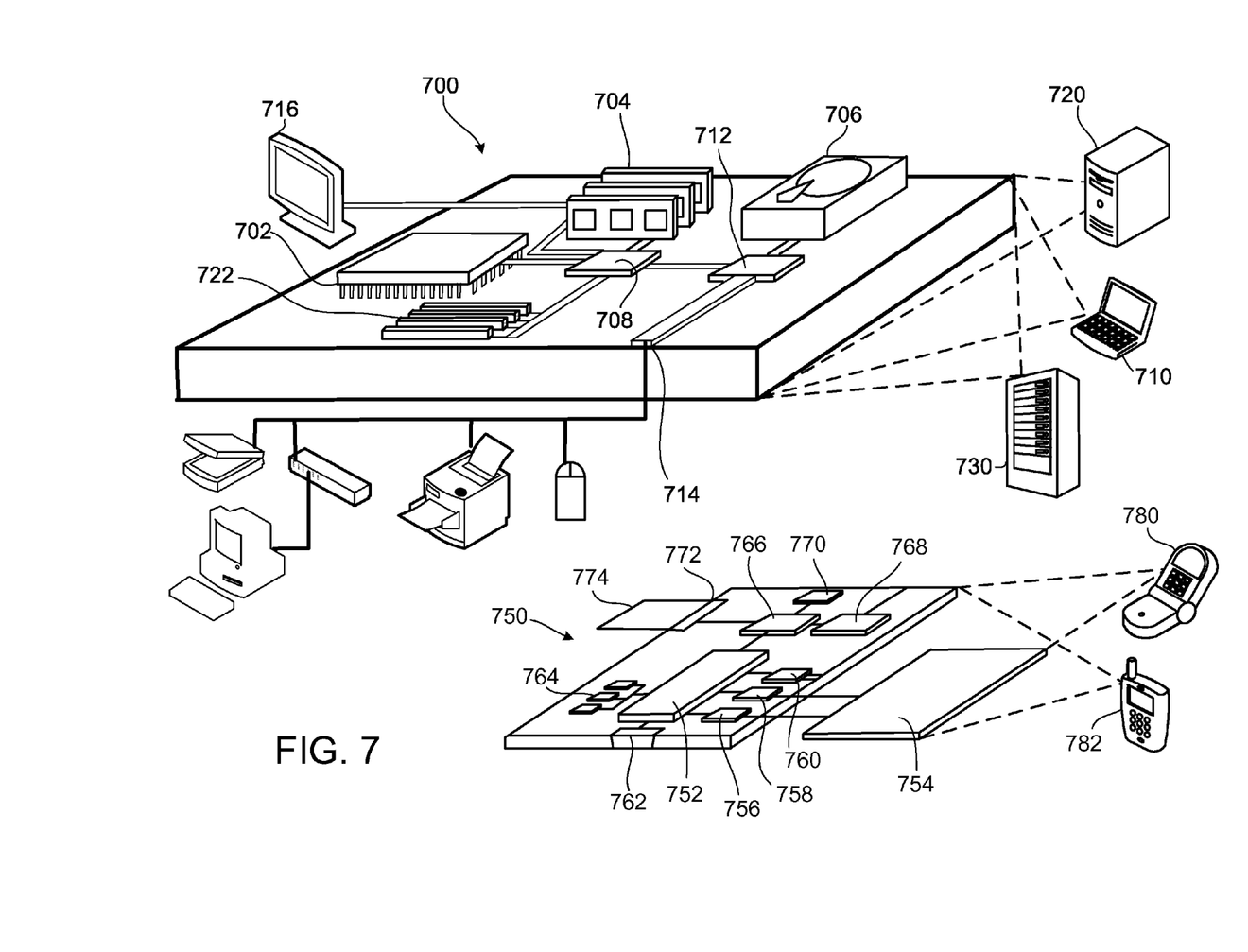
FIG. 7 is a diagram of computing devices that may be used to implement the systems and methods described in this document, as either a client or as a server or plurality of server.

FIG. 7 is a block diagram of computing devices 700, 750 that may be used to implement the systems and methods described in this document, as either a client or as a server or plurality of servers. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. Additionally computing device 700 or 750 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, microphone/speaker pair, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 524. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units.

Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752 that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

For instances in which the systems and/or methods discussed here may collect personal information about users, or may make use of personal information, the users may be provided with an opportunity to control whether programs or features collect personal information, e.g., information about a user's social network, social actions or activities, profession, preferences, or current location, or to control whether and/or how the system and/or methods can perform operations more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained, such as to a city, ZIP code, or state level, so that a particular location of a user cannot be determined. Thus, the user may have control over how information is collected about him or her and used.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments have been described. Other embodiments are within the scope of the following claims. For example, the actions recited in the claims may be performed in a different order and still achieve desirable results.

What is claimed is:

1. A method performed by data processing apparatus, the method comprising:
   receiving, by a server system that provides an automated speech recognition service over a computer network, audio data for an utterance detected by a client device in communication with the server system over the computer network;
   accessing, by the server system, association data that indicates a plurality of associations, each association indicating (i) uncorrupted audio data indicating characteristics of an uncorrupted audio segment, and (ii) a corresponding key based on a corrupted version of the same uncorrupted audio segment, the associations being determined before receiving the audio data for the utterance;
   selecting, by the server system, uncorrupted audio data based on a comparison of (i) one or more keys based on the audio data for the utterance, with (ii) the keys based on the corrupted audio data;
   constructing, by the server system, a representation of the utterance comprising the selected uncorrupted audio data; and
   performing, by the server system, speech recognition on the constructed representation of the utterance to determine a transcription of the utterance.

2. The method of claim 1, wherein selecting the uncorrupted audio data comprises:
   determining, based on the comparison, that a key corresponding to a particular portion of audio data for the utterance matches a particular key; and
   based on the determination, selecting the uncorrupted audio data that is associated with the particular key in the association data;
   wherein constructing the representation of the utterance comprises constructing the representation of the utterance to include the uncorrupted audio data that is associated with the particular key in place of the particular portion of the audio data for the utterance.

3. The method of claim 1, wherein each key based on corrupted audio data is a corrupted feature vector indicating characteristics of a corrupted audio segment, and where selecting the uncorrupted audio data comprises:

obtaining first feature vectors of the received audio data for the utterance;

comparing the first feature vectors to the corrupted feature vectors;

identifying, based on the comparison of the first feature vectors to the corrupted feature vectors, a particular corrupted feature vector for a particular first feature vector; and based on identifying the particular corrupted feature vector, selecting an uncorrupted feature vector that corresponds to the particular corrupted feature vector to include in the constructed representation of the utterance.

4. The method of claim 1, wherein each of the one or more keys based on the audio data for the utterance comprises a hash value for a feature vector that indicates characteristics of the audio data for the utterance;

wherein each of the keys based on the corrupted audio data comprises a hash value for a feature vector that indicates characteristics of the corresponding corrupted audio data.

5. The method of claim 1, wherein each corrupted version of an uncorrupted audio segment is a version of an uncorrupted audio segment that has been modified to add noise, reverberation, echo, or distortion after the uncorrupted audio segment has been recorded.

6. The method of claim 1, wherein each corrupted version of an uncorrupted audio segment is a version of an uncorrupted audio segment that has been modified, after the uncorrupted audio segment has been recorded, to include audio characteristics representative of one or more candidate environments.

7. The method of claim 1, comprising:
before receiving the audio data for the utterance:
accessing data that includes uncorrupted audio segments;
adding noise to the uncorrupted audio segments to generate, for each uncorrupted audio segment, one or more corrupted versions of the uncorrupted audio segment, wherein each of the one or more corrupted versions of the uncorrupted audio segment has different noise added to the uncorrupted audio segment;
generating, for each of the corrupted versions of the uncorrupted audio segments, association data that indicates an association of (i) uncorrupted audio data indicating characteristics of a particular uncorrupted audio segment, and (ii) a corresponding key based on a corrupted version of the particular uncorrupted audio segment; and
storing the association data.

8. The method of claim 1, wherein the uncorrupted audio segments are segments of speech spoken by one or more users.

9. The method of claim 1, wherein the representation of the utterance comprising the selected uncorrupted feature vectors has less noise than the first feature vectors indicating characteristics of the utterance.

10. The method of claim 1, wherein generating the constructed representation comprises generating, as the constructed representation, a series of feature vectors that represents the utterance.

11. The method of claim 1, wherein the utterance is an utterance of a first user, wherein the selected uncorrupted audio data comprises audio segments of utterances of speakers different from the first user;

wherein generating the constructed representation comprises generating, as the constructed representation, a series of audio segments that includes the audio segments of utterances of speakers different from the first user.

12. The method of claim 1, wherein the uncorrupted audio data for an uncorrupted audio segment comprises an uncorrupted feature vector that indicates characteristics of the uncorrupted audio segment;

wherein the corrupted audio data for a corrupted audio segment comprises a corrupted feature vector indicating characteristics of the corrupted audio segment;

wherein each key based on corrupted audio data comprises (i) a corrupted feature vector or (ii) an index value based on the corrupted feature vector, and wherein each of the one or more keys based on the audio data for the utterance comprises (i) a feature vector indicating characteristics of the audio data for the utterance or (ii) an index value based on the feature vector indicating characteristics of the audio data for the utterance.

13. A system comprising:
one or more computers and one or more storage devices storing instructions that are operable, when executed by the one or more computers, to cause the one or more computers to perform operations comprising:
receiving, over a computer network, audio data for an utterance detected by a client device in communication with the one or more computers over the computer network;
accessing association data that indicates a plurality of associations, each association indicating (i) uncorrupted audio data indicating characteristics of an uncorrupted audio segment, and (ii) a corresponding key based on a corrupted version of the same uncorrupted audio segment, the associations being determined before receiving the audio data for the utterance;
selecting uncorrupted audio data based on a comparison of (i) one or more keys based on the audio data for the utterance, with (ii) the keys based on the corrupted audio data;
constructing a representation of the utterance comprising the selected uncorrupted audio data; and
performing speech recognition on the constructed representation of the utterance to determine a transcription of the utterance.

14. The system of claim 13, wherein selecting the uncorrupted audio data comprises:
determining, based on the comparison, that a key corresponding to a particular portion of audio data for the utterance matches a particular key; and
based on the determination, selecting the uncorrupted audio data that is associated with the particular key in the association data;
wherein constructing the representation of the utterance comprises constructing the representation of the utterance to include the uncorrupted audio data that is associated with the particular key in place of the particular portion of the audio data for the utterance.

15. The system of claim 13, wherein each key based on corrupted audio data is a feature vector, a hash value that is based on the corrupted audio data, an index value identifying the corrupted audio data, or a set of activations at a layer of a neural network.

16. The system of claim 13, wherein each corrupted version of an uncorrupted audio segment is a version of an uncorrupted audio segment that has been modified to add noise, reverberation, echo, or distortion after the uncorrupted audio segment has been recorded.

17. The system of claim 13, wherein each corrupted version of an uncorrupted audio segment is a version of an uncorrupted audio segment that has been modified to include audio characteristics representative of one or more candidate environments.

18. The system of claim 13, wherein the operations comprise:

before receiving the audio data for the utterance:
accessing data that includes uncorrupted audio segments;
adding noise to the uncorrupted audio segments to generate, for each uncorrupted audio segment, one or more corrupted versions of the uncorrupted audio segment, wherein each of the one or more corrupted versions of the uncorrupted audio segment has different noise added to the uncorrupted audio segment;
generating, for each of the corrupted versions of the uncorrupted audio segments, association data that indicates an association of (i) uncorrupted audio data indicating characteristics of a particular uncorrupted audio segment, and (ii) a corresponding key based on a corrupted version of the particular uncorrupted audio segment; and
storing the association data.

19. A non-transitory computer-readable storage device storing software comprising instructions executable by one or more computers which, upon such execution, cause the one or more computers to perform operations comprising:

receiving, by a server system that provides an automated speech recognition service over a computer network, audio data for an utterance detected by a client device in communication with the server system over the computer network;

accessing, by the server system, association data that indicates a plurality of associations, each association indicating (i) uncorrupted audio data indicating characteristics of an uncorrupted audio segment, and (ii) a corresponding key based on a corrupted version of the same uncorrupted audio segment, the associations being determined before receiving the audio data for the utterance;

selecting, by the server system, uncorrupted audio data based on a comparison of (i) one or more keys based on the audio data for the utterance, with (ii) the keys based on the corrupted audio data;

constructing, by the server system, a representation of the utterance comprising the selected uncorrupted audio data; and performing, by the server system, speech recognition on the constructed representation of the utterance to determine a transcription of the utterance.

20. The non-transitory computer-readable device of claim 19, wherein the operations comprise:

before receiving the audio data for the utterance:
accessing data that includes uncorrupted audio segments;
adding noise to the uncorrupted audio segments to generate, for each uncorrupted audio segment, one or more corrupted versions of the uncorrupted audio segment, wherein each of the one or more corrupted versions of the uncorrupted audio segment has different noise added to the uncorrupted audio segment;
generating, for each of the corrupted versions of the uncorrupted audio segments, association data that indicates an association of (i) uncorrupted audio data indicating characteristics of a particular uncorrupted audio segment, and (ii) a corresponding key based on a corrupted version of the particular uncorrupted audio segment; and
storing the association data.

* * * * *